(12) United States Patent
Schweitzer, III et al.

(10) Patent No.: US 11,114,892 B2
(45) Date of Patent: Sep. 7, 2021

(54) ELECTRIC POWER SYSTEM TRANSDUCER FAILURE MONITOR AND MEASUREMENT RECOVERY

(71) Applicant: Schweitzer Engineering Laboratories, Inc., Pullman, WA (US)

(72) Inventors: Edmund O. Schweitzer, III, Pullman, WA (US); Daqing Hou, Des Moines, WA (US); David E. Whitehead, Pullman, WA (US); Tony J. Lee, Henderson, NV (US); Krishnanjan Gubba Ravikumar, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 0 days.

(21) Appl. No.: 17/034,128

(22) Filed: Sep. 28, 2020

(65) Prior Publication Data
US 2021/0111586 A1 Apr. 15, 2021

Related U.S. Application Data

(60) Provisional application No. 62/914,453, filed on Oct. 12, 2019.

(51) Int. Cl.
*H02J 13/00* (2006.01)

(52) U.S. Cl.
CPC .... *H02J 13/0004* (2020.01); *H02J 13/00002* (2020.01); *H02J 13/00006* (2020.01)

(58) Field of Classification Search
CPC ............. H02J 13/0004; H02J 13/00002; H02J 13/00006
See application file for complete search history.

(56) References Cited

U.S. PATENT DOCUMENTS

| | | | |
|---|---|---|---|
| 6,385,022 B1 | 5/2002 | Kulidjian |
| 6,396,279 B1 | 5/2002 | Gruenert |
| 6,608,493 B2 | 8/2003 | Hensler |
| 6,795,789 B2 | 9/2004 | Vandiver |
| 6,847,297 B2 | 1/2005 | Lavoie |
| 6,892,115 B2 | 5/2005 | Berkcan |
| 6,892,145 B2 | 5/2005 | Topka |

(Continued)

FOREIGN PATENT DOCUMENTS

CN 104065050 9/2017

OTHER PUBLICATIONS

PCT/US2020/053713 Patent Cooperation Treaty, International Search Report and Written Opinion of the International Searching Authority, dated Feb. 8, 2021.

(Continued)

*Primary Examiner* — Hal Kaplan
*Assistant Examiner* — Thai H Tran
(74) *Attorney, Agent, or Firm* — Gregory C. Baker (57) ABSTRACT

Systems and methods including improving availability of protection of an electric power delivery system even upon unavailability of power system signals. Such protection relays may provide protection using signals from the power system and provide the signals to an integrator or another device. Upon unavailability of power system signals to a protection relay, the integrator sends substitute power system signals may be provided to the protection relay. The protection relay may continue to provide protection using the substitute power system signals.

18 Claims, 7 Drawing Sheets

(56) References Cited

U.S. PATENT DOCUMENTS

| | | |
|---|---|---|
| 6,909,942 B2 | 6/2005 | Andarawis |
| 6,985,784 B2 | 1/2006 | Vandevanter |
| 6,999,291 B2 | 2/2006 | Andarawis |
| 7,012,421 B2 | 3/2006 | Lavoie |
| 7,043,340 B2 | 5/2006 | Papallo |
| 7,058,481 B2 | 6/2006 | Jiang |
| 7,058,482 B2 | 6/2006 | Fletcher |
| 7,068,483 B2 | 6/2006 | Papallo |
| 7,068,612 B2 | 6/2006 | Berkcan |
| 7,111,195 B2 | 9/2006 | Berkcan |
| 7,117,105 B2 | 10/2006 | Premerlani |
| 7,151,329 B2 | 12/2006 | Andarawis |
| 7,254,001 B2 | 8/2007 | Papallo |
| 7,259,565 B2 | 8/2007 | Diercks |
| 7,262,943 B2 | 8/2007 | Stellato |
| 7,301,738 B2 | 11/2007 | Pearlman |
| 7,460,590 B2 | 12/2008 | Lee |
| 7,532,955 B2 | 5/2009 | Dougherty |
| 7,636,616 B2 | 12/2009 | Fletcher |
| 7,693,607 B2 | 4/2010 | Kasztenny |
| 7,747,354 B2 | 6/2010 | Papallo |
| 7,747,356 B2 | 6/2010 | Andarawis |
| 7,986,503 B2 | 7/2011 | Papallo |
| 8,024,494 B2 | 10/2011 | Soed |
| 8,213,144 B2 | 7/2012 | Papallo |
| 8,560,255 B2 | 10/2013 | Elwarry |
| 8,891,963 B2 | 11/2014 | Patel |
| 9,366,711 B2 | 6/2016 | Klapper |
| 9,632,147 B2 | 4/2017 | Hensler |
| 9,819,611 B2 | 11/2017 | Snowdon |
| 10,178,047 B2 | 1/2019 | Chapman |
| 10,379,991 B2 | 8/2019 | Yang |
| 2003/0048508 A1 | 3/2003 | Yu |
| 2004/0008461 A1 | 1/2004 | Kojovic |
| 2009/0012728 A1 | 1/2009 | Spanier |
| 2009/0296583 A1 | 12/2009 | Dolezilek |
| 2010/0002348 A1 | 1/2010 | Donolo |
| 2010/0040068 A1 | 2/2010 | Wimmer |
| 2010/0183298 A1 | 7/2010 | Biegert |
| 2010/0332865 A1 | 12/2010 | Dubose |
| 2015/0377930 A1 | 12/2015 | Lsis |
| 2016/0013632 A1 | 1/2016 | Lloyd |
| 2017/0026291 A1 | 1/2017 | Smith |
| 2017/0195362 A1 | 7/2017 | Schweitzer, III |
| 2017/0288950 A1 | 10/2017 | Manson |
| 2018/0034689 A1 | 2/2018 | Kanabar |
| 2018/0089057 A1* | 3/2018 | Yang ............... G06F 11/3495 |
| 2018/0348267 A1 | 12/2018 | Yang |

OTHER PUBLICATIONS

David Costello: Understanding and Analyzing Event Report Information, Oct. 2000.

Joe Perez: A Guide to Digital Fault Recording Event Analysis, 2010.

Considerations for Use of Disturbance Recorders; a Report to the System Protection Subcommittee of the Power System Relaying Committee of the IEEE Power Engineering Society, Dec. 27, 2006.

David Costello: Event Analysis Tutorial, Part 1: Problem Statements 2011.

Jane Starck, Antti Hakala-Ranta, Martin Stefanka, Switchgear Optimization Using IEC 61850-9-2 and Non-Conventional Measurements May 23, 2012.

Will Allen, Tony Lee: Flexible High-Speed Load Shedding Using a Crosspoint Switch Oct. 2005.

Qiaoyin Yang, Rhett Smith: Improve Protection Communications Network Reliability Throught Software-Defined Process Bus, Jan. 2018.

Caitlin Martin, Steven Chase, Thanh-Xuan Nguyen, Dereje Jada Hawaz, Jeff Pope, Casper Labuschagne: Bus Protection Considerations for Various Bus Types; Oct. 2013.

* cited by examiner

ELECTRIC POWER SYSTEM TRANSDUCER FAILURE MONITOR AND MEASUREMENT RECOVERY

RELATED APPLICATION

This application claims priority to U.S. Provisional Patent Application No. 62/914,453, filed Oct. 12, 2019, for "SUBSTATION INTEGRATOR FOR IMPROVED PROTECTION AVAILABILITY," the disclosure of which is hereby incorporated herein in its entirety by this reference.

TECHNICAL FIELD

This disclosure relates to a system for maintaining power system protection during loss of a signal or a failed signal from a portion of the power systems (e.g., from an instrument transformer). More particularly, this disclosure relates to systems for routing power system signals to protection relays during loss of a signal or a failed signal from an instrument transformer.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Electric power delivery systems are widely used to generate, transmit, and distribute electric power to loads, and serve as an important part of the critical infrastructure. Power systems and components are often monitored and protected by intelligent electronic devices (IEDs) and systems of IEDs that obtain electric power system information from the equipment and provide protective actions, monitor, and automate the power system. Several IEDs may be in communication to facilitate sharing of information for station-wide, area-wide, or even system-wide protection.

Modern electric power protection systems are integrated with automation, monitoring, and supervisory systems that rely on digital communication. IEDs perform various protection, automation, monitoring, and metering tasks that require proper settings and communications between IEDs and among IEDs and other devices. Such systems of IEDs are highly engineered for the proper functioning of the devices individually and the system as a whole. Because of reliance on multiple devices for obtaining electric power system signals, and reliance on communications between multiple devices, such systems of IEDs may be subject to unavailability of power system protection during failure of one or more instrument transformers, communication media, merging units, communication switches, and the like.

Embodiments of the disclosure include improved systems for maintaining protection of electric power system equipment even when power system signals become unavailable (e.g., due to signal loss and/or failures). In some embodiments, a system of protection relays (e.g., a primary protection relays) and an integrator or another routing device may provide substitute electric power system signals. Such embodiment may improve protection availability even during unavailability of certain power system signals and improve electric power delivery protection.

Merging units (MUs) are electronic devices (e.g., IEDs) that may be used in electric power systems in locations, such as, for example, substations. For example, MUs may function as data acquisition devices that connect to substation components, such as primary transducers like current transformers (CTs) and potential transformers (PTs). The MUs may sample data from the CTs and PTs, convert the data into digital samples (e.g., with analog-to-digital converters), and transmit these digitalized samples to other intelligent electronic devices (e.g., remote IEDs), such as digital protective relays and/or digital fault recorders (DFRs).

A digital relay may use the measurements from one set of a PT and a CT (e.g., provided via the MUs) to perform protection functions of electric apparatus like transmission lines, transformers, and generators. However, the measurement path between the device being monitored and the protection relay (e.g., a copper connection and/or a fiber communication link) may fail or may be otherwise be compromised in a manner that affects the protection relay's ability to monitor these values. For example, fuse protection on one of the circuits of a PT may interrupt current flowing through the fuse (e.g., blow). By way of further example, CTs may fail to faithfully reproduce primary-side currents when an iron core of the CT saturates, which results in CT saturations and/or an inrush of CT current. Further, PTs may fail to faithfully reproduce primary-side voltage (e.g., during a capacitor voltage transformer (CVT) transient). Such events, and others, may result in a loss of CT (LOC) and/or loss of PT (LOP) conditions and the relay may partially or entirely lose access to the voltage and/or current measurements. A digital relay may detect some or all of these abnormal transducer measurements and adjust (e.g., disable) associated protection elements affected accordingly in order to avoid or minimize the incorrect operation of the protection relay.

While a digital protection relay may have one or more functions to detect errors or outages in the data provided from the device to be monitored, the digital protection relay generally is only provided one set of data for the associated connected device (e.g., one set of PT and CT measurements). Embodiments of the present disclosure may enable the protection relay to receive multiple measurements relating to the one or more devices being monitoring. Such a configuration will generally result in enabling the protection relay to obtain at least one measurement reading even when one or more other reading may not be available or may be corrupted due to a signal failure (e.g., a local signal failure such as a LOP condition caused by a blown fuse).

In some embodiments, a network (e.g., a substation communication network having relatively a high-bandwidth) may enable the protection relay to connect to multiple MUs and to receive multiple sets of measurements from those MUs (e.g., multiple sets of CT and PT measurements) as those measurements are passed throughout the substation. In some embodiments, the MUs may provide sampled values (SV) over a process bus network (e.g., in accordance with IEC 61850 standards). In additional embodiments, such SVs may include any digital transmission of measured values using any of a wide variety of protocols, applications, transport types, network protocol types, and/or hardware types. For example, the SVs may be provided directly to the protective relay or via a switch. In some embodiments, the SVs may be provided to one or both of the protective relay and an integrator in communication with the integrator, where the integrator acts as a supervisory system that coordinates operations among multiple protective relays and other devices.

With access to multiple data sources (e.g., CT and PT measurements inside a substation), the protection relay or another device (e.g., an integrator or switch) may detect failures or problems (e.g., errors, inconsistencies, outside of expected values, loss of signal, etc.) with the measurement by comparing the data across more than one source. In some embodiments, the data from the measurement may be processed in order to determine and/or estimate the underlying levels. For example, the protection relay or other device may use the provided values to calculate the measurements via a known relationship (e.g., Kirchhoff's circuit laws and/or other equalities). By way of further example, the protection relay or device may use the known relationship to monitor for signal failure (e.g., when a known equation is no longer satisfied in an expected manner).

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Several aspects of the embodiments described may be implemented as software modules or components. As used herein, a software module or component may include any type of computer instruction or computer-executable code located within a memory device and/or transmitted as electronic signals over a system bus or wired or wireless network. In addition, data being tied or rendered together in a database record may be resident in the same memory device, or across several memory devices, and may be linked together in fields of a record in a database across a network. Embodiments may be provided as a computer program product including a non-transitory computer and/or machine-readable medium having stored thereon instructions that may be used to program a computer (or other electronic device(s)) to perform processes described herein.

Figure 1:
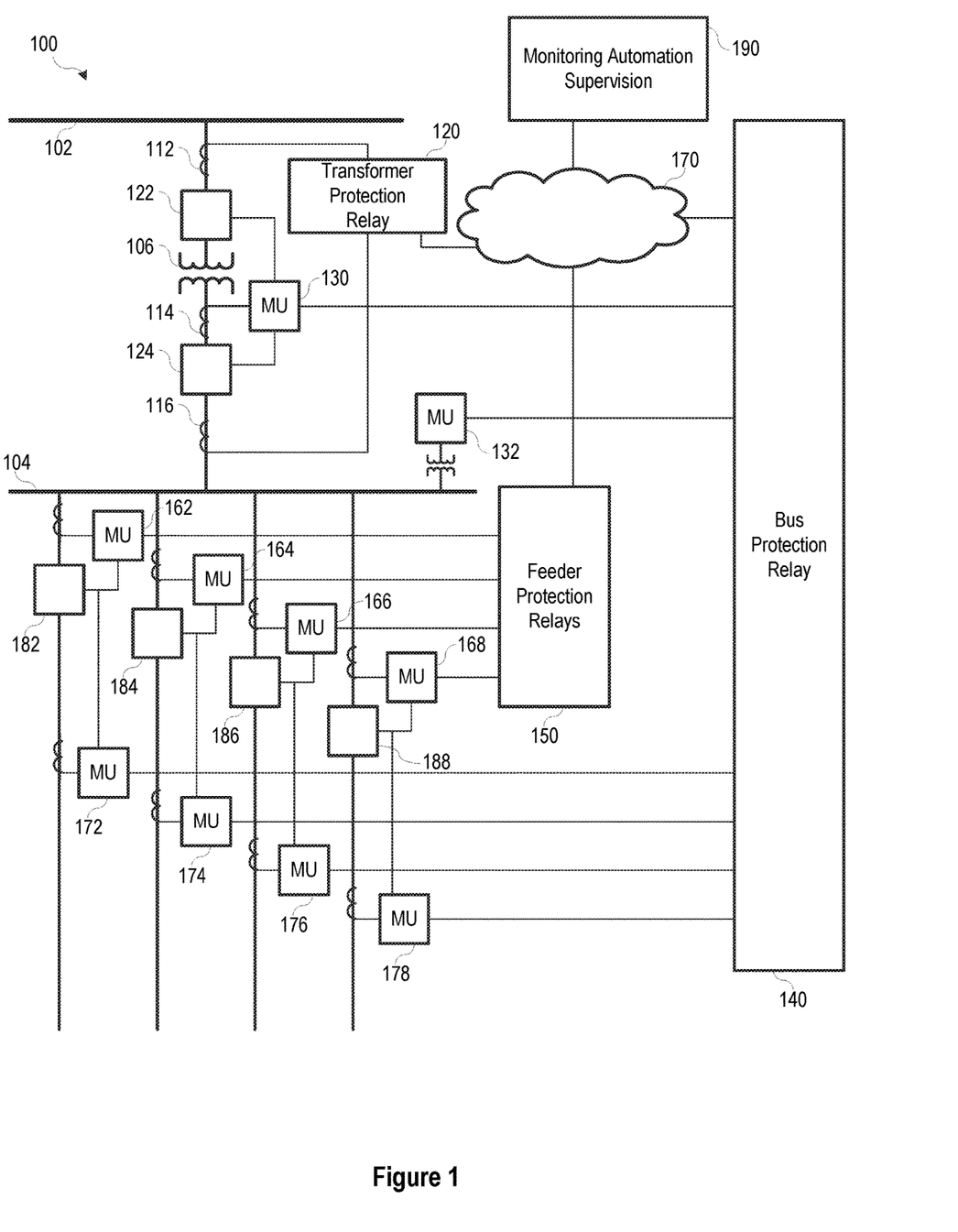
FIG. 1 illustrates a simplified one-line diagram of an electric power delivery system for providing electric power to loads including a system of traditional intelligent electronic devices (IEDs) relays for protection and automation.

FIG. 1 illustrates a simplified one-line diagram of an electric power delivery system 100. It should be noted that the system 100 may include multiple phases and additional equipment and complexity. Also illustrated is a system of IEDs that obtain electric power system information from merging units (MUs), and effect control actions on the electric power system. The power system includes various equipment such as a bus 102 (illustrated as a transmission bus) providing electric power to a second bus 104 (illustrated as a distribution bus) via a transformer 106 for stepping down the power from a high (transmission) voltage to a lower (distribution) voltage. Various feeders extend from the second bus 104 for delivering electric power to distributed loads. Circuit breakers 122, 124, 182, 184, 186, 188 may be used to selectively connect and disconnect portions of the power system for various purposes such as reconfiguration, protection in the event of a fault, or the like.

A bus protection relay 140 may be an IED to determine operating conditions on a zone that includes the second bus 104 and provide signals to effect a protection operation upon determination of an adverse condition. IED 140 may obtain current signals related to electric power entering the bus 104 from MU 130, voltages from bus 104 using MU 132, and current signals related to electric power leaving bus 104 on the feeders from MUs 172, 174, 176, and 178. IED 140 may provide differential protection, overvoltage protection, and various other protection for a zone including the bus 104. Current differential protection for the zone covered by the bus protection relay 140 may require current signals into bus 104 and current signals leaving bus 104, obtained using current signals from each feeder off of bus 104 from merging units 172, 174, 176, 178.

A feeder protection relays 150 may include one or more IEDs that obtain bus voltage signals (e.g. from MU 132) and current signals related to the feeders from MUs 162, 164, 166, and 168. Feeder protection relays 150 may provide overcurrent, directional, distance, overfrequency, underfrequency, and other protection to the feeders. Feeder protection relays 150 may communicate with bus protection relay 140 via network 170.

A transformer relay may be an IED 120 to provide protection to the transformer 106. IED 120 may obtain current signals from both sides of the transformer 106 from MUs or even directly from current transformers (CTs) 112 and 116. IED 120 may further provide information to IED 140 (e.g. via communications network 170). IED 120 may provide differential protection overcurrent protection, over frequency protection, underfrequency protection, and other various protection for the transformer 106.

MUs may be in communication with various circuit breakers 122, 124, 182, 184, 186, and 188 to provide signals to the circuit breakers and receive status information from the circuit breakers. Upon receiving an "open" signal from an IED, the MUs may signal related circuit breakers to open. For example, upon detection of an overcurrent condition on the first feeder, IED 150 may signal MU 162 to open breaker 182 to remove current from the faulted feeder.

In various embodiments, the IEDs may be in communication with a monitoring, automation, or other supervisory system or device 190, such as a SCADA system. Such communications may be facilitated over communications network 170. Communications architecture as illustrated are highly engineered, and present multiple possible points of failure and attack. As mentioned above, a failure in communications or a cyber-attack on the system may affect the bus protection relay 140, feeder protection relay 150, or transformer relay 120 resulting in disruption of the protection of the power system.

Figure 2:
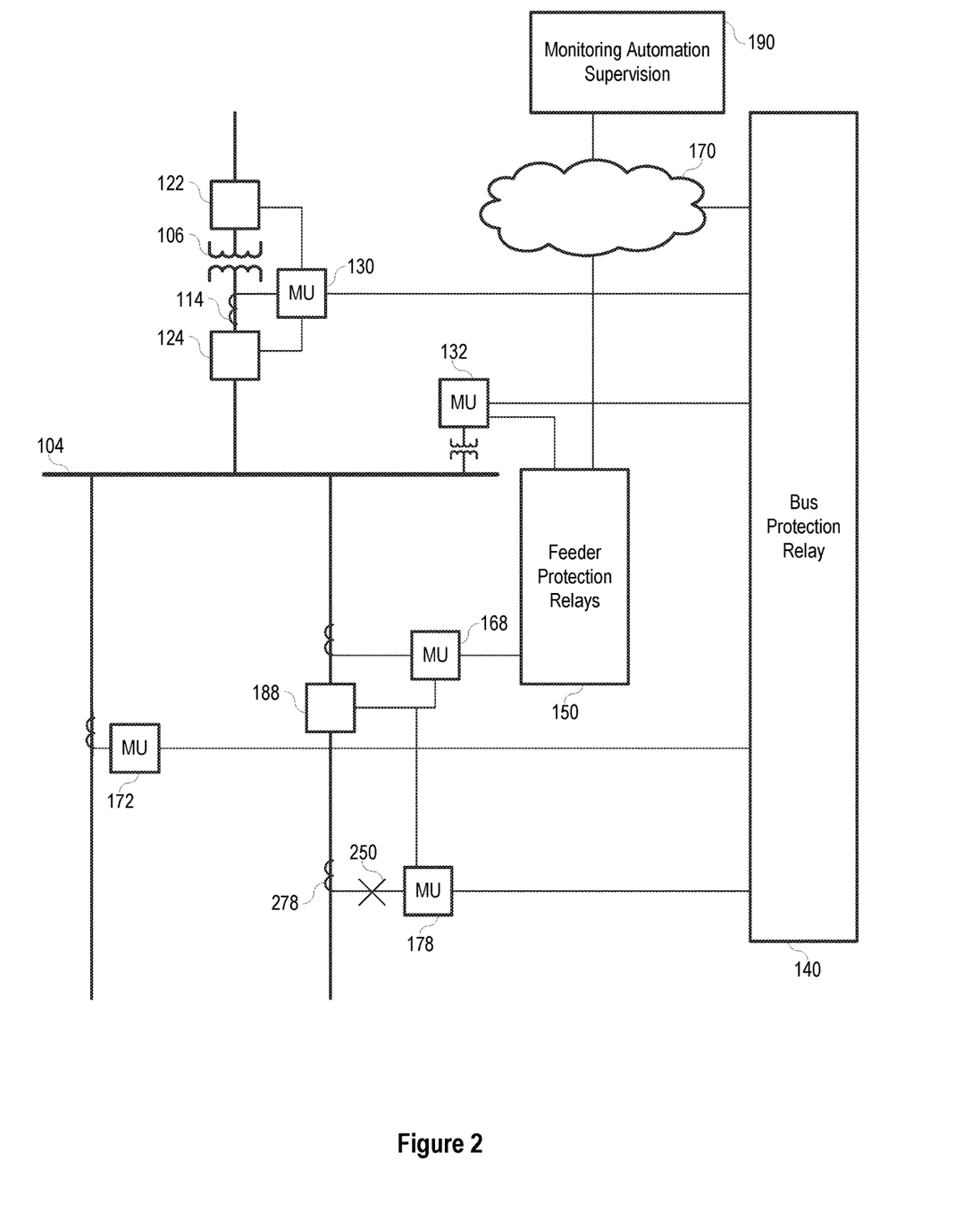
FIG. 2 illustrates a simplified one-line diagram of a system of FIG. 1, with a failed equipment signal.

FIG. 2 illustrates a simplified one-line diagram of an electric power system similar to that of FIG. 1, with various equipment and devices removed for simplicity. As illustrated in FIG. 2, bus protection relay 140 may obtain signals related to current on the supply side of the bus 104 from merging unit 130, and signals related to current on the load side of the bus 104 from various merging units including MUs 172 and 178. Current differential protection in bus protection relay 140 may require current signals on the supply side, and all current signals from the load side of bus 104. However, as depicted, the current signal from merging unit 178 may be unavailable, as indicated by one or more signal failures 250 (e.g., loss of signal, corrupted signals, signals not within an expected range, etc.). For example, such failures 250 may be due to a hardware failure of the instrument transformer 278, failure in the electrical connection(s) to the merging unit 178, failure in the communications from merging unit 178 to the bus protection relay 140, failure in other equipment or devices (e.g., a communication switch, patch panel, or the like) between the merging unit and the bus protection relay 140, miswiring of the instrument transformer 278 or merging unit 178, failure of the communications port in the bus protection relay 140 in connection with merging unit 178, similar failures, and/or combinations thereof. Upon unavailability 250 of such current signals, the bus protection relay 140 cannot perform bus current differential protection. Accordingly, failure in the system equipment or devices for providing electric power signals to the bus protection relay reduces protection availability.

Figure 3:
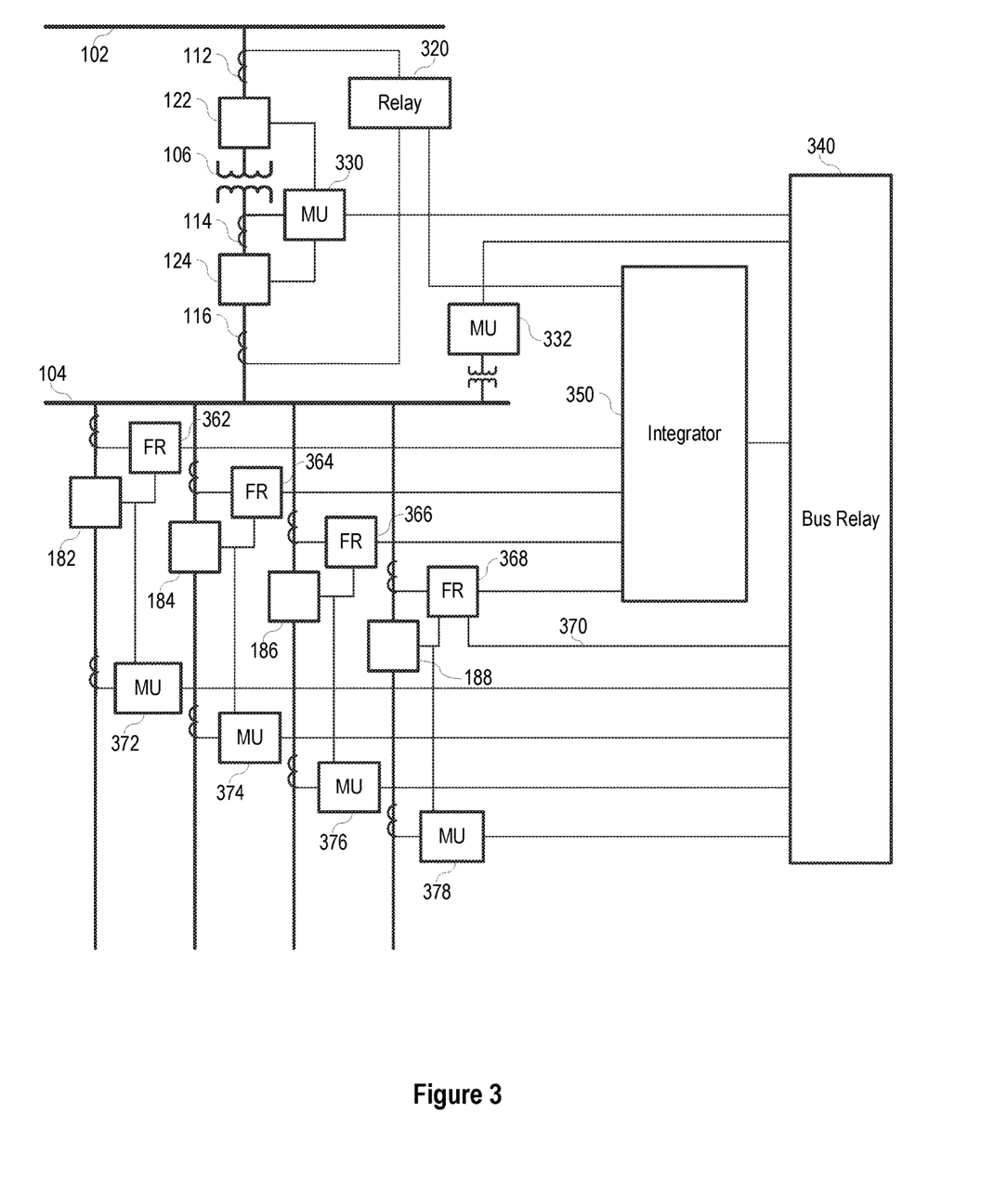
FIG. 3 illustrates a simplified one-line diagram of an electric power delivery system for providing electric power to loads including protection relays and integration system in accordance with some embodiments herein.

FIG. 3 illustrates a simplified one-line diagram of an electric power delivery system that may be similar to the system illustrated in FIG. 1, including a protection system in accordance with the present disclosure. In particular, the protection system includes various protection relays: primary transformer protection relay PPR-T 320, primary bus protection relay 340 (e.g., PPR-B), primary feeder protection relays PPR-F1 362, PPR-F2 364, PPR-F3 366, and PPR-F4 368, that do not depend on communication with automation, monitoring, or supervisory systems to continue providing critical protection to the electric power delivery system equipment. Such protection relays may be used to separate protection functions from other functions traditionally performed by IEDs. Communications among protection relays may be facilitated by an integrator 350. Integrator 350 may act as a supervisory system that coordinates operations among a plurality of primary protective relays and other devices. Protection relays 320, 340, 362, 364, 366, 368 may obtain power system signals using merging units such as MUs 330, 332, 372, 374, 376, 378; using instrument transformers; or the like.

Feeders from bus 104 may be protected using feeder relays PPR-F1 362, PPR-F2 364, PPR-F3 366, and PPR-F4 368. Feeder relays 362-368 may obtain current signals from respective feeders using CTs and/or merging units such as MUs 372, 374, 376, 378. Feeder relays 362-368 may further obtain voltage signals from the bus using a potential transformer (PT) and/or a merging unit such as MU 332. Using the current and/or voltage signals, the feeder relays 362-368 may determine operating conditions on the respective feeders including, for example: phase overcurrent; ground overcurrent; neutral overcurrent; negative sequence overcurrent; arc flash; overvoltage, undervoltage; directional power; overfrequency; underfrequency; rate-of-change-of-frequency; fault direction; fault distance; and the like. In the event of a condition determined outside of predetermined operating conditions, the feeder relay 362-368 may send an open or trip command to an associated circuit breaker, thus effecting a protective action on the electric power delivery system.

Feeder relays 362-368 may be in communication with respective circuit breakers 182, 184, 186, 188 as illustrated. In various embodiments, the feeder relays 362-368 may be in direct communication with the circuit breakers 182-188 as illustrated. In various other embodiments, the feeder relays 362-368 may be in communication with the circuit breakers 182-188 via merging units such as MUs 372-378. Accordingly, feeder relays 362-368 may provide protection to the feeders using measurements from the power system, using the measurements in one or more protective elements, and effecting a protective action by commanding a circuit breaker to open.

The protection system may include an integrator 350 in communication with various devices and equipment in the electric power delivery system. The integrator 350 may perform monitoring, automation, supervisory, communication, secondary (non-critical, backup, or the like) protection, and other functions. As illustrated, the protection relays (such as, for example, the transformer relay 320 and the feeder relays 362-368) may be in communication with the integrator 350. According to various embodiments, the protection relays may transmit digitized analog values, states, and/or commands to the integrator 350 useful for its monitoring, automation, backup, supervisory, and other functions, and for communication to other protection relays.

The protection relays may transmit such communications in accordance with a predetermined communication protocol. In various embodiments, the protocol includes an identification of the protection relay that is sending the communication, and a payload of the predetermined set of signal values, states, and commands. The payload may vary depending on the type of protection relay (feeder protection relay, transformer protection relay, bus protection relay, or the like). A user may apply settings to the protection relay governing which signal values, states, and commands are transmitted. Protection relays may transmit such communications in accordance with a predetermined schedule. Protection relays may continuously send such communications regardless of a change in state or command.

As mentioned above, each protection relay may perform protection functions for the equipment monitored thereby with or without communications with the integrator 350, other protection relays, or IEDs. For example, the primary bus protection relay 340 may perform bus current differential protection, overcurrent protection, and the like, even without communications with the integrator 350. In another example, the transformer relay PPR-T 320 may perform overcurrent protection, overvoltage protection, undervoltage protection, and differential protection for the transformer 106 using signals obtained from the equipment regardless of communication with the integrator 350 or other devices. Further automation, control, and protection functions may be performed using signals from other protection relays or supervisory systems received by transformer relay 320 via the integrator 350. For example, in the case of a breaker failure on one of the feeders, the responsible protection relay of the feeder may provide a breaker failure signal to the integrator 350. The integrator 350 may send breaker failure signals to the bus protection relay 340. Upon receipt of the breaker failure signal, the bus protection relay 340 may signal MU 330 to open breaker 124 and/or breaker 122, to deenergize the faulted feeder.

The protection system may also include a protection relay in the form of a bus protection relay 340 to provide protective functions to the bus 104. Bus protection relay 340 may be a protection relay, as it is capable of obtaining power system measurements and providing protective functions without communication with any monitoring or other supervisory system. Bus protection relay 340 may obtain electric power system measurements related to electric power entering and leaving the protected bus 104 using CTs, PTs and the like and/or merging units. For example, protection relay 340 may include a number of communication ports for receiving power system signals from various other protection devices and/or merging units. The communication ports may facilitate communications on optical media, electrical media, or the like. The communication ports may facilitate one-way or bi-directional communication. Current measurements on one side of the bus 104 from merging unit 330, which obtains current signals using CT 114, may be provided to the protection relay 340 via communication port.

As illustrated, bus protection relay 340 obtains current measurement on one side of the bus 104 from merging unit 330, which obtains current signals using CT 114. Voltage measurements may be obtained from merging unit 332, which obtains voltage signals from the bus 104 using a PT. Measurements of current on the other side of the bus 104 may be obtained from merging units 372, 374, 376, 378, which obtain current signals from the feeders using CTs. The bus protection relay 340 may use the currents and/or voltages to perform various protection functions such as, for example: overcurrent (phase, ground, neutral); breaker failure; time-overcurrent; current differential; undervoltage; overvoltage; and the like. The bus protection relay 340 may protect a zone of the electric power delivery system such as, for example, the zone between circuit breaker 124 and breakers 182-188. The bus protection relay 340 may detect an event using the currents and/or voltages, and send a trip command to one or more circuit breakers to remove power from a portion of the power system affected by the event. For example, the bus protection relay 340 may determine that a fault is present on bus 104 using current differential protection principles, and command breaker 124 to open (either via direct communication or via merging unit 330) to remove electric power from the faulted bus 104. The bus protection relay 340 may further command breakers 182-188 to open (either via direct communication or via merging units 372-378) to limit potential backfeed from the feeders into the faulted bus 104.

Similar to the protection relays 320 and 362-368, the bus relay may continue providing protective functions to the power system regardless of availability of any integrator, monitoring, automation, or supervisory systems or devices. In various embodiments described herein, the protection relays 320, 340, 362-368 may primarily perform protective functions, with secondary functions being removed to a separate device, such as the integrator 350. For example, calculating, time stamping, and time aligning synchrophasors may be unnecessary for protective functions, and thus removed to the integrator. Similarly, many communications functions such as formatting communications to correspond with supervisory protocols may be removed to the integrator.

Some protection functions may be performed by a combination of protection relays. For this, the system may include some communication between protection relays. As illustrated, a dedicated communication pathway 370 is configured between feeder relay 368 and bus relay 340. Although a single communication pathway between one feeder relay and the bus relay is illustrated, several protection relays may be in similar communication. The communication may be peer-to-peer, high speed, and operate on optical or electrical media. The communication may operate in accordance with the MirroredBits® protocol available from Schweitzer Engineering Laboratories, Inc. of Pullman, Wash. In certain embodiments, the communication may facilitate protection functions such as, for example, transfer trip, blocking, interlocking, permissive schemes, direct control, relay-to-relay communications, or the like. In the illustrated example, the communication 370 may be useful for direct transfer tripping by the bus relay 340 in the event of breaker failure detection by the feeder relay 368. Thus, the bus relay may clear a fault by opening breaker 124 and/or 122 in the event that breaker 188 does not trip.

The integrator 350 may communicate monitoring, automation, and supervisory information to the protection relays, and to facilitate communications among the protection relays. For example, the integrator 350 may perform breaker failure analysis to determine if a breaker has operated after a signal has been sent to open the breaker. If the integrator 350 determines that the breaker has not opened, it may send a signal to the merging unit and/or to the appropriate protection relay to attempt to open the breaker. The integrator 350 may also signal a second breaker to open, where the second breaker is positioned to also remove power from the effected portion of the electric power delivery system. For example, upon failure of breaker 182, the integrator 350 may signal for breaker 122 or 124 to open, removing power from the bus 104 and related feeders.

The integrator 350 may further send specified communications from certain protection relays to appropriate receiving protection relays. For example, bus 104 voltage measurements from the primary bus protection relay 340 may be useful for certain protection operations of the feeder protection relays 362-368. Accordingly, the integrator 350 may send bus voltage measurements from protection relay 340 to each of the feeder protection relays 362-368 by routing such voltage measurements to the communications ports associated with each of the feeder protection relays 362-368.

Communications between the protection relays and the integrator may be bi-directional. In various embodiments, the integrator 350 may include multiple communications ports, each associated with a different protection relay. Each communications channel may be synchronous or asynchronous. Each communications channel may be deterministic such that communications among protection devices is deterministic. With different communication ports in communication with different protection relays, the integrator 350 may be easily configured to route specific communications among different protection relays by simply routing the communications between different communication ports.

Communications between the various merging units and protection relays may be bi-directional. For example, the merging units may send signals related to electric power system measurements and equipment status using a predetermined protocol. Protection relays may send commands to the connected merging units (such as open, close, step up, step down, and the like) using the predetermined protocol. The merging units signal primary equipment in accordance with the received commands.

Figure 4:
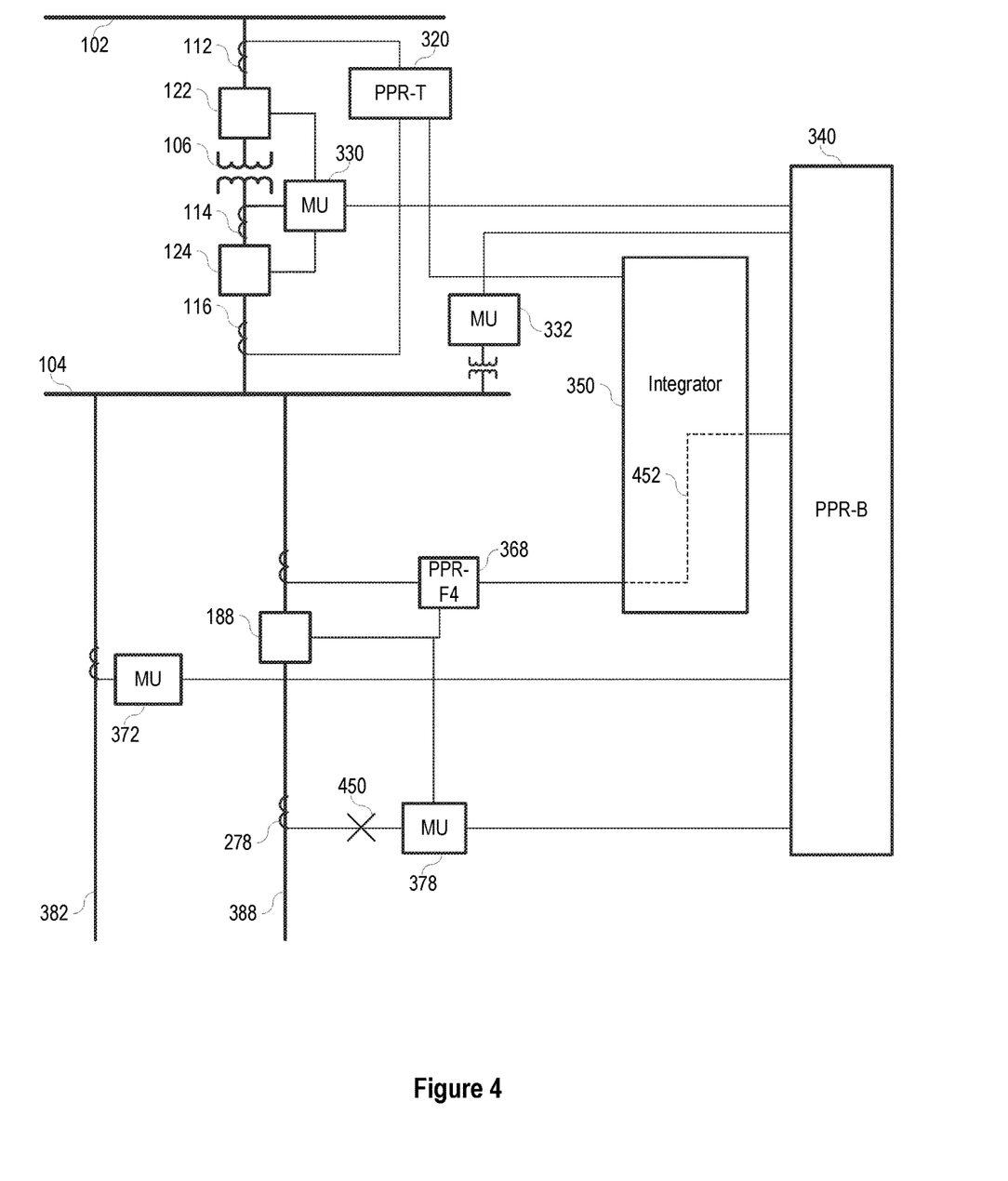
FIG. 4 illustrates a simplified one-line diagram of system of FIG. 3, with a failed equipment signal and improved protection availability.

FIG. 4 illustrates a simplified one-line diagram of the electric power system and protection system of FIG. 3, with various equipment and devices removed for simplicity. As illustrated, the current signals from CT 278 are unavailable due to one or more signal failures 450. Similar to that discussed above with reference to FIG. 2, the unavailability may be due to one or more of a number of causes. In prior protection systems, unavailability of the current signal for feeder 388 may result in the failure of bus current differential protection by primary bus protection relay 340.

The integrator 350 may route substitute electric power system signals to maintain protection of the electric power delivery system upon unavailability of certain electric power system signals. As illustrated, the current on feeder 388 may be monitored using signals from MU 378 or, as one possible substitute in the cases of failure 450, using signals from primary feeder protection relay PPR-F4 368. As illustrated, the feeder protection relay 368 may obtain signals related to current on feeder 388 using equipment separate from the equipment used by MU 378 to obtain current signals. Feeder protection relay 368 may provide signals related to current on feeder 388 to the integrator 350. Upon unavailability 450 of the current signal to the primary bus protection relay 340, the integrator may route the current signals from the primary feeder protection relay 368 to the primary bus protection relay 340. As described below, the integrator 350 may include a communications switch that may route 452 the substitute signals upon occurrence of an event, such as unavailability of certain electric power system signals.

Figure 5:
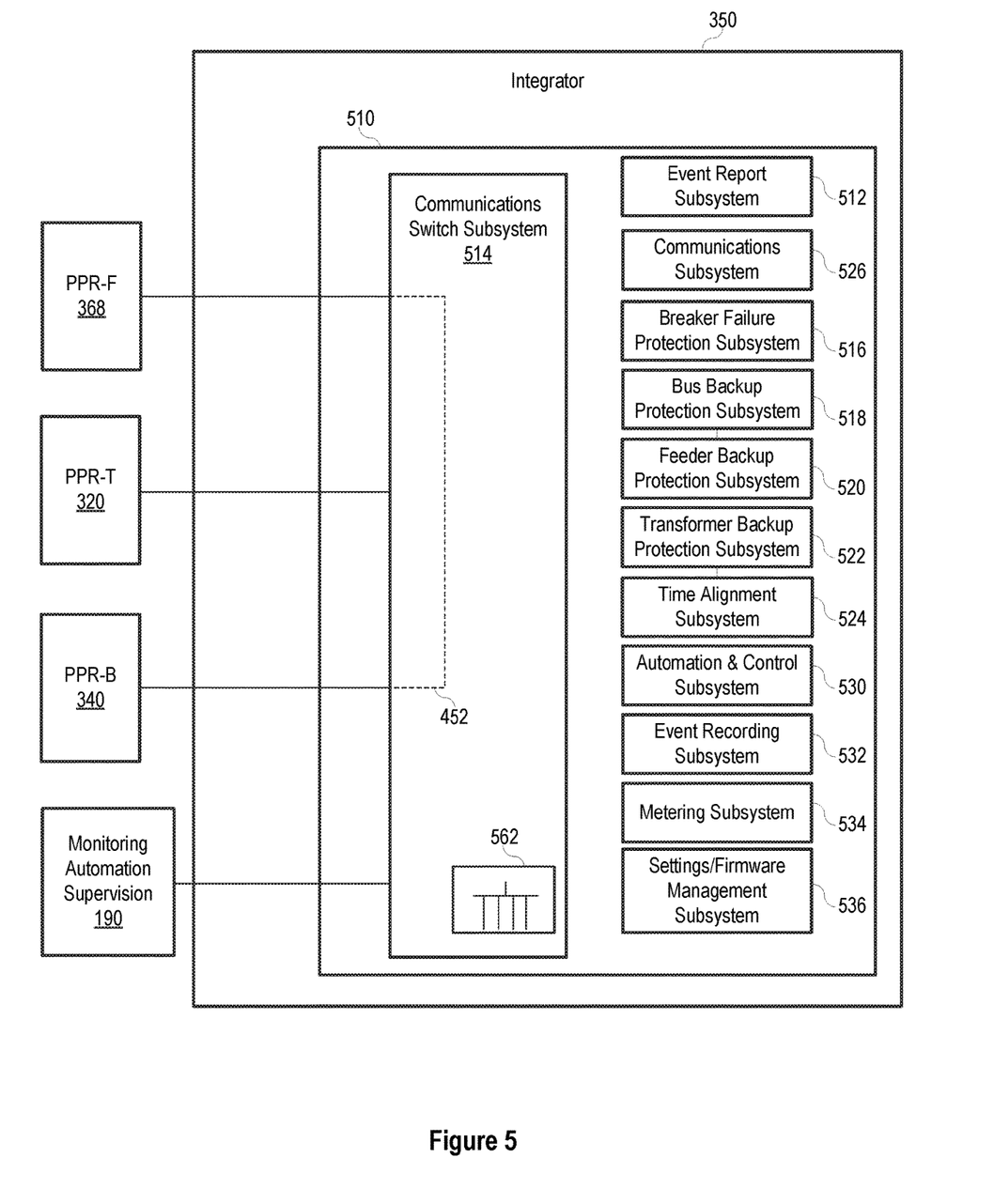
FIG. 5 illustrates a simplified block diagram of an integrator for communication among protection relays in accordance with some embodiments herein.

FIG. 5 illustrates a simplified block diagram of an integrator 350 in accordance with some embodiments of this disclosure. While FIG. 5 focuses on the integrator 350, in other embodiments, at least some or all similar functions may be performed by other devices, such as, for example, by a protective relay itself and/or in a network switch device (e.g., a network switch, such as that discussed below with reference to FIG. 7, including some or all of the subsystems of the integrator).

As illustrated in FIG. 5, the integrator 350 may include a number of subsystems, for example, each of the internals blocks depicted. The integrator 350 facilitates provisioning of substitute electric power system signals upon unavailability of preferred electric power system signals to increase availability of protection of the electric power system. Several other functions of the integrator include routing of communications among protection relays, provision of non-primary protective functions such as automation and backup protection for the power system, integration with other integrators, as well as communication with monitoring, automation, and supervisory systems. Certain functions previously performed by IEDs protecting electric power systems that are not directly required for protection may be removed from the primary protection devices in accordance with the present disclosure and performed by an integrator 350. Each integrator 350 may be in communication with one or more protection devices, one or more other integrators 350, as well as other monitoring, automation, and supervisory systems.

The integrator 350 includes a processing device 510 for executing instructions related to such functions. The processing device 510 may be any processor capable of executing computer instructions including, for example, a computer processor, a microprocessor, an FPGA, or the like, and may be packaged with or be in communication with computer memory for storing computer instructions to be executed by the processing device 510. The processing device 510 may be embodied as one or more processing devices, with different modules, or groups of modules, processed by different processors. The various operations that may be stored as computer instructions and when executed by the processing device 510 performed by the integrator include, for example, event reporting subsystem 512, communications switch subsystem 514, breaker failure subsystem 516, bus backup protection subsystem 518, feeder backup protection subsystem 520, transformer backup protection subsystem 522, time alignment subsystem 524, communications subsystem 526, and the like. Additional functions that may be performed by the integrator 350 include automation and control subsystem 530. The integrator 350 may include event recording subsystem 532 functions where power system conditions, time, and actions taken are recorded for later retrieval, and/or transmission using the event report function subsystem 512. The integrator 350 may perform metering operations with metering operations subsystem 534. The integrator 350 may also perform settings and/or firmware management operations subsystem 536 such as, maintaining current records of settings and firmware versions for each of the connected primary relays; updating settings on primary relays; updating firmware of primary relays; and the like.

The integrator 350 may be in communication with, and even facilitate communication among several of the protection devices, as discussed herein including, for example: one or more feeder protection relays PPR-F (e.g., feeder protection relays 362, 364, 366, 368); transformer protection relay PPR-T 320; bus protection relay PPR-B 340; motor relay, generator relay; and the like. The integrator 350 may be in communication with one or more other integrators, monitoring, automation, or supervisory systems 190. As discussed above, the integrator 350 may perform communication functions and may function as a communication switch among the various connected devices.

As mentioned above, the integrator 350 may include a communications switch subsystem 514. The communications switch subsystem 514 as illustrated is implemented in the processing device 510. In various other embodiments, the communications switch subsystem 514 may be a separate device operating in the integrator 350. The communications switch subsystem 514 may be configured as described herein to facilitate communications among the various protection relays. Further, the communications switch subsystem 514 may route substitute electric power system signals to protection relays upon unavailability of certain other electric power system signals.

For example, as illustrated in FIG. 4, upon unavailability of a current signal from a feeder to the primary bus protection relay 368, the integrator 350 may route signals representative of current on that feeder from the primary feeder protection relay 368. Thus, a substitute current signal is provided to the primary bus protection relay 340 for maintaining bus current differential protection by the primary bus protection relay 340.

The communication switch subsystem 514 may have access to a power system topology subsystem 562 stored in the integrator 350. The topology subsystem 562 may include information that indicates voltage and/or current connections of different equipment on the power system. For example, the topology subsystem 562 may include information indicating that the current from primary feeder protection relay 368 should be the same as the current from the MU 378 because both measure currents on the same feeder with no branches between the measuring points.

Upon loss, or another indication of unreliability, of the current signal from MU 378, the primary bus protection relay 340 may indicate to the integrator 350 the unavailability of the current signal. Communications between protection relays and the integrator may be bi-directional, allowing for digitized analog power system signals, control signals, and the like to be sent from the protection relays to the integrator 350, and for certain digitized analog power system signals, control signals, and the like to be sent from the integrator 350 to the various protection relays. Upon the receipt at the integrator 350 of the communication from the primary bus protection relay 340 of the unavailability of the current signal from MU 378 representing current on feeder 388, the integrator 350 may search the topology subsystem 562 for an adequate substitute signal. Because the topology subsystem 562 indicates that the current from MU 378 is sufficiently equal to the current measured by primary feeder protection relay 368, the integrator 350 may route such digitized analog current signals from primary feeder protection relay 368 to the primary bus protection relay 340. The primary bus protection relay 340 may then continue to provide protection using the digitized analog current signals routed from the primary feeder protection relay as substitute current signals for the unavailable current signals from MU 378.

In various embodiments, the integrator 350 may include a timing signal from time alignment subsystem 524 with the substitute current signals such that the bus protection relay 340 may time-align the signals needed for its protection elements.

Furthermore, the integrator 350 may format and transmit an alarm indicating the unavailability of the signal from MU 378. The alarm may be communicated using an HMI, front panel, LED indicator, or sent to a supervisory or automation system such as SCADA. Personnel may then be dispatched to investigate and correct for the equipment failure.

Although several examples are provided herein for providing substitute current signals for bus current differential protection, substitute signals may be provided for many different types of protection. For example, voltages obtained at the bus and at the bus side of the transformer may be substituted for each other for undervoltage protection and other protection elements.

Figure 6:
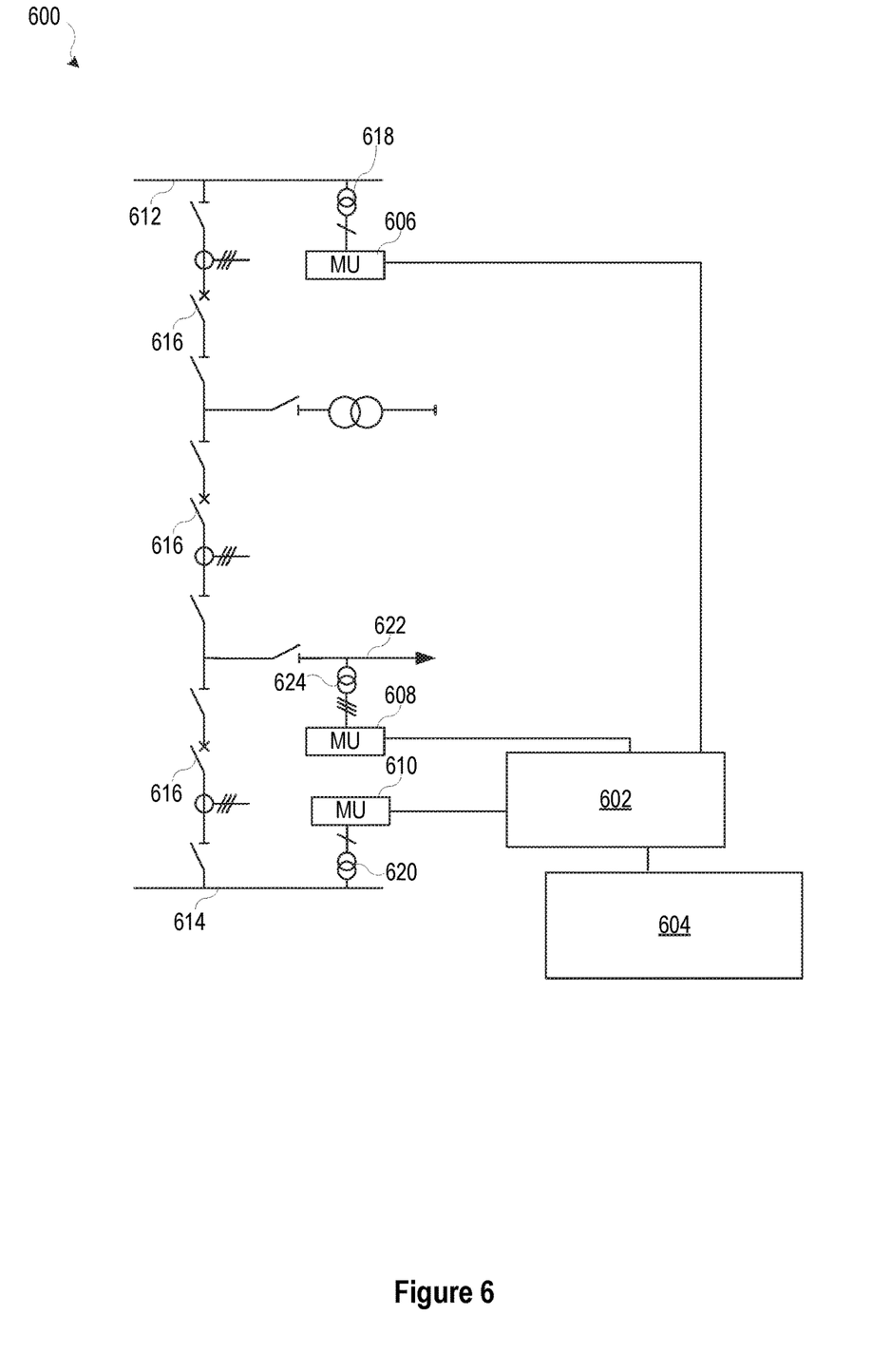
FIG. 6 illustrates a simplified diagram of a portion of an electrical system in accordance with embodiments of the disclosure.

FIG. 6 illustrates a simplified diagram of a portion of an electrical system 600 in accordance with embodiments of the disclosure. As depicted, the system 600 includes one or more devices for monitoring signals of the system 600, as discussed above. For example, a first device (e.g., a switch 602, such as an ethernet switch) electrically coupled to a second device (e.g., a protection relay 604). In some embodiments, rather than multiple devices, for monitoring signals of the system 600, one integrated device may be used. In some embodiments, rather than the switch 602 and the protection relay 604, an integrator 350 and the protection relay 604 may be used in a manner similar to that discussed above.

In some embodiments, one or both of the switch 602 and the relay 604 may include some of all of the subsystems of the integrator 350 discussed above with reference to FIG. 5.

As depicted in FIG. 6, the switch 602 may be electrically coupled to multiple merging units (MUs) 606, 608, 610 to receive signals (e.g., voltage and/or current measurements) from the MUs 606, 608, 610. As above, the MUs 606, 608, 610 may sample data from the components of the system 600 (e.g., from one or more CTs and PTs), convert the data into digital samples, and transmit these digitalized samples to the switch 602 and/or relay 604. The MUs 606, 608, 610 are electrically coupled, directly or indirectly, to one or more buses (e.g., buses 612, 614) via distribution lines or feeders and one or more breakers 616. As depicted, two of the MUs 606, 610 may be coupled to bus transformers 618, 620 (e.g., PTs) and one of the MUs 608 may be coupled to line 622 and a line transformer 624 (e.g., a PT).

In manner similar to that discussed above, upon failure of one or more signals from one or more of the MUs 606, 608, 610 (e.g., loss of signal, a corrupted signal, a signal not within an expected range, etc.), one or both of the switch 602 and the relay 604 may recognize the deficient signal and provide a substitute signal that may be obtained from another one of the MUs 606, 608, 610 and/or may be determined (e.g., calculated, estimated, etc.), as discussed below.

By way of specific example, an interruption of current flowing through a fuse in line 622 (e.g., an A-phase line) may cause a loss of PT (LOP) measurement from MU 608. However, the PT measurement may be substituted as the switch 602 and/or the relay 604 may detect the LOP situation by recognizing the signal loss or signal failure. The switch 602 and/or the relay 604 may then detect the A-phase measurement from MU 610 (e.g., when the breaker 616 positioned between MU 608 and MU 610 is closed) or detect that the A-phase measurement from MU 606 (e.g., when both of the breakers 616 positioned between MU 608 and MU 606 are closed) in order to substitute the lost or failed signal. In such a configuration, the failed reading of voltage and/or current from the transformer 624, which would normally be provided from MU 608, may be obtained from MU 606 or MU 610.

Figure 7:
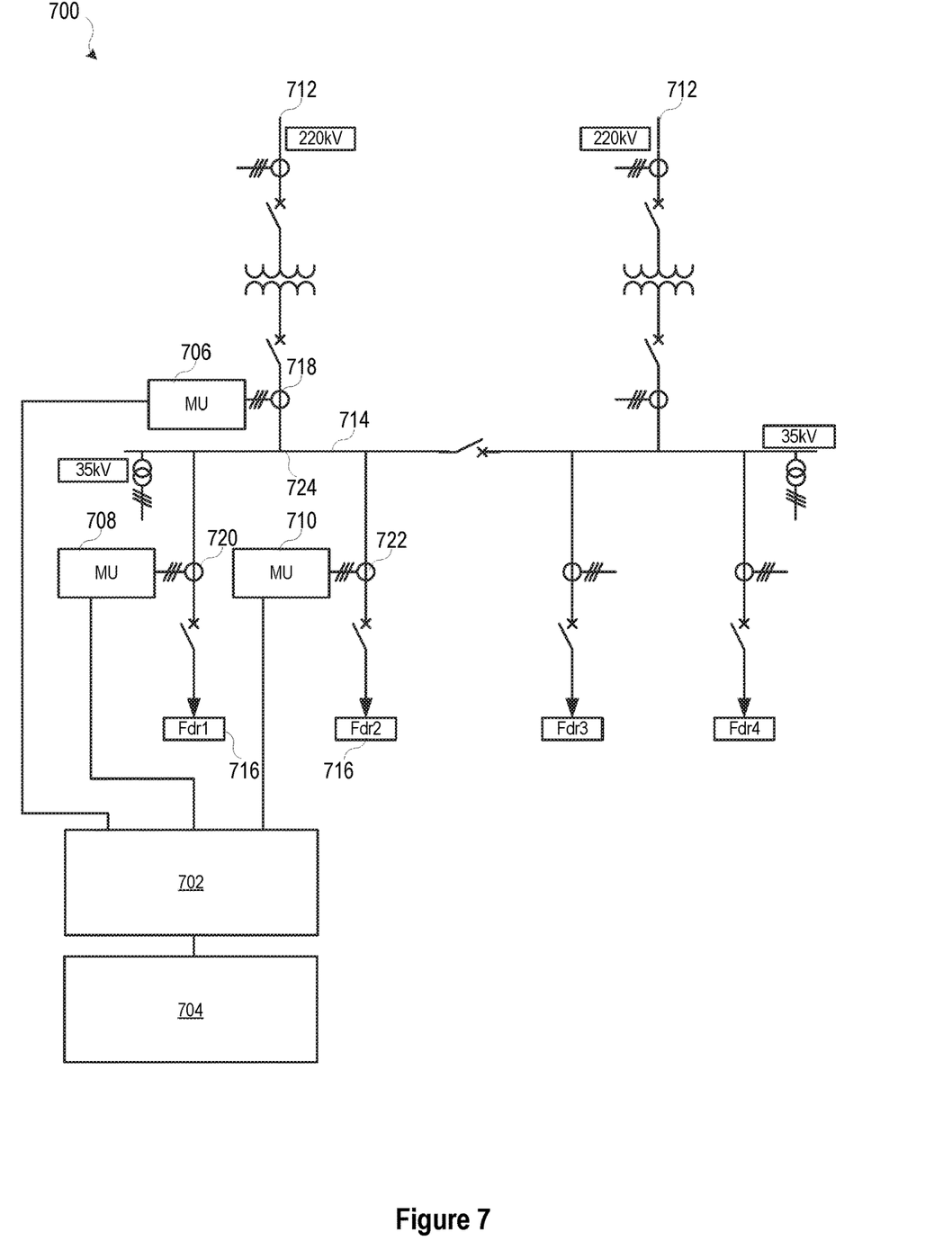
FIG. 7 illustrates a simplified diagram of a portion of an electrical system in accordance with embodiments of the disclosure.

FIG. 7 illustrates a simplified diagram of a portion of an electrical system 700 in accordance with embodiments of the disclosure. As depicted, the system 700 includes one or more devices for monitoring signal of the system 700, as discussed above. For example, a first device (e.g., a switch 702, such as an ethernet switch) electrically coupled to a second device (e.g., a protection relay 704). As above, in some embodiments, rather than multiple devices, for monitoring signals of the system 700, one integrated device may be used. In some embodiments, rather than the switch 702 and the protection relay 704, an integrator 350 and the protection relay 704 may be used in a manner similar to that discussed above.

The switch 702 may be electrically coupled to multiple merging units (MUs) 706, 708, 710 to receive signals (e.g., voltage and/or current measurements) from the MUs 706, 708, 710. As above, the MUs 706, 708, 710 may sample data from the components of the system 700 (e.g., from one or more CTs and PTs), convert the data into digital samples, and transmit these digitalized samples to the switch 702 and relay 704.

As depicted, the MUs 706, 708, 710 are positioned on multiple sides of a node 724 (e.g., one a high-side and a low-side). For example, MU 706 may be electrically coupled to a transformer 718 (e.g., CT) on one or more high voltage sources 712 that supply a distribution bus 714. The distribution bus 714 is electrically coupled to multiple feeder lines 716. As depicted, two of the MUs 708, 710 may be coupled to transformers 720, 722 (e.g., CTs) on the feeder lines 716 and the relay 704 may protect the feeder lines 716.

In manner similar to that discussed above, upon failure of one or more signals from one or more of the MUs 706, 708, 710 (e.g., loss of signal, a corrupted signal, a signal not within an expected range, etc.), one or both of the switch 702 or the relay 704 may recognize the deficient signal and provide a substitute signal, which signal may be obtained from another one of the MUs 706, 708, 710 and/or which signal may be determined (e.g., calculated, estimated, etc.), as discussed below.

By way of specific example, a loss of CT (LOC) measurement from any of the MUs 706, 708, 710 may be detected by the switch 702 and/or the relay 704. As above, the switch 702 and/or the relay 704 may substitute the current by obtaining a reading from one of the other MUs 706, 708, 710.

In some embodiments, the substitute signal or value may be calculated by the switch 702 and/or the relay 704, or even another device to recover a missing measurement (e.g., a current value). For example, the switch 702 and/or the relay 704 may use the measurement provided from the MUs 706, 708, 710, which measurements are not determined to be lost, failed, or otherwise unreliable. Such measurements may be used to calculate (e.g., estimate) the missing measurement via a known relationship (e.g., Kirchhoff's circuit laws, Ohm's law, and/or other equalities). By way of specific example, under Kirchhoff's current law, the sum of the currents at a node (e.g., node 724, which includes the currents detected by MUs 706, 708, 710) will equal zero. If one reading from the MUs 706, 708, 710 is defective, the switch 702 and/or the relay 704 may use Kirchhoff's current law to determine the detective reading from one of the MUs 706, 708, 710 by summing the other readings form the remaining MUs 706, 708, 710 to determine the missing reading. In additional embodiments, any type of nodal analysis and/or mesh analysis may be used.

In some embodiments, such known relationships may be used to determine and/or monitor for a failure. For example, using Kirchhoff's circuit laws (e.g., current law), any time the sum of the currents of each of the MUs 706, 708, 710 does not equal zero, the system 700 may determine that a failure is occurring (e.g., a LOC condition). The system 700 can then recover the lost reading using the same known relationship or a different relationship.

By way of further example, where the equation is not satisfied (e.g., the sum of currents do not equal zero) and a selected level of harmonic current is detected on a measurement from one of the MUs 706, 708, 710, it may be determined that the CT being monitored by that one of the MUs 706, 708, 710 associated with the MU is saturated. As above, the system 700 can then recover the lost reading using the same known relationship or a different relationship.

In some embodiments, as above, the system 700 may include one or more subsystems or components for determining the topology of the portion of the power system 700 that is being monitored and/or for monitoring the time alignment of the received signals. For example, in order to correctly monitoring one or more portions of the system 700 (e.g., one or more nodes), the topology of the system 700 may be used to determine the node being monitored and the timing of the measurements received by the system 700 in order to correctly define and monitor a defined node over a given time period.

While specific embodiments and applications of the disclosure have been illustrated and described, it is to be understood that the disclosure is not limited to the precise configurations and components disclosed herein. Accordingly, many changes may be made to the details of the above-described embodiments without departing from the underlying principles of this disclosure. The scope of the present disclosure should, therefore, be determined only by the following claims.

What is claimed is:

1. A device for electric power system protection, comprising:
    a communication subsystem to communicate with a plurality of instrument transformers in communication with one or more components of an electric power system and to receive electric power system signals from the plurality of instrument transformers; and
    a processing subsystem in communication with the communication subsystem, the processing subsystem to:
        evaluate the electric power system signals from the plurality of instrument transformers;
        determine a deficiency in at least one electric power signal of the electric power system signals; and
        when the deficiency in the at least one electric power signal is determined:
            calculate a value of at least one substitute electric power signal from a known relationship of a circuit in which the plurality of instrument transformers are connected using at least some of the electric power system signals from the plurality of instrument transformers; and
            provide the calculated value of the at least one substitute electric power signal of the electric power system signals to a protection device to determine if a protective action by the protection device of the electric power system is warranted.

2. The device of claim 1, wherein the device comprises an integrator in communication with a plurality of protection relays.

3. The device of claim 2, wherein the integrator is to determine the deficiency in the at least one electric power signal when an indication of unavailability of the at least one electric power signal is received by the communication subsystem from one of the plurality of protection relays.

4. The device of claim 1, wherein the device comprises a switch in communication with at least one protection relay.

5. The device of claim 4, wherein the switch is to determine the deficiency in the at least one electric power signal and to forward the at least one substitute electric power signal to the at least one protection relay for the at least one protection relay to determine if the protective action is necessary.

6. The device of claim 1, wherein the device comprises at least one protection relay.

7. The device of claim 1, wherein the communication subsystem is to receive the electric power system signals from a plurality of merging units, each merging unit being in communication with one of the plurality of instrument transformers.

8. The device of claim 7, wherein the device is to determine the deficiency in the at least electric power signal from a first merging unit of the plurality of merging units and to provide the at least one substitute electric power signal from another merging unit of the plurality of merging units.

9. The device of claim 1, wherein the device is to determine the deficiency in the at least electric power signal by monitoring deviation from a known relationship of at least some of the electric power system signals.

10. The device of claim 1, wherein the processing subsystem is to at least one of:
    calculate the at least one substitute electric power signal using a sum of current measurements from at least some of the electric power system signals; or
    determine the deficiency in the at least one electric power signal when the sum of the current measurements of at least some of the electric power system signals does not equal zero.

11. The device of claim 10, the processing subsystem to determine a node of the electric power system from a topology of the electric power system and to identify the sum of the current measurements from at least some of the electric power system signals based on inputs and output of the node.

12. A system for electric power system protection, comprising:
a plurality of protection relays, each protection relay to receive electric power system signals from at least one instrument transformer of a plurality of instrument transformers in communication with equipment of an electric power system and to provide protection to the electric power delivery system using the electric power system signals; and
an integrator in communication with the plurality of protection relays, the integrator comprising:
a topology subsystem to determine topology of the electric power system;
a communication interface subsystem to receive digitized analog signals from the plurality of protection relays;
a communication switch to route substitute digitized analog signals from a first protection relay to a second protection relay of the plurality of protection relays upon receipt of an indication of unavailability of one or more of the electric power system signals to the second protection relay; and
a processing device to determine a value of the substitute digitized analog signals from a known relationship of at least a portion of the topology of the electric power system.

13. The system of claim 12, wherein the integrator is to communicate time information with the substitute digitized analog signals.

14. The system of claim 12, wherein the second protection relay comprises a bus protection relay.

15. The system of claim 14, wherein the second protection relay is to provide bus current differential protection.

16. The system of claim 15, wherein the first protection relay comprises a feeder protection relay.

17. A method for electric power system protection, comprising:
providing digitized power system signals from the electric power system to a receiving device;
determining a deficiency in at least one digitized electric power signal of the digitized electric power system signals with the receiving device;
when the deficiency in the at least one digitized electric power signal is determined:
calculating at least one substitute digitized electric power signal based a known topology of at least a portion of the electric power system using at least some of the digitized electric power system signals;
providing the value of the at least one substitute digitized electric power signal of the digitized electric power system signals to a protection device of the electric power system receiving device; and
determining if a protective action by the protection device of the electric power system is warranted based on at least one substitute digitized electric power signal.

18. A method for electric power system protection, comprising:
obtaining first power system signals from a first electric power system equipment with a first protection relay;
providing a protection action with the first protection relay using the first power system signals;
obtaining second power system signals from a second electric power system equipment with a second protection relay;
transmitting digitized analog signals representative of electric power system signals of the second electric power system equipment from the second protection relay to an integrator;
upon the first power system signals becoming unavailable to the first protection relay, the first protection relay transmitting an indication of unavailability to the integrator;
receiving the indication of unavailability with the integrator;
verifying that the second power system signals may be substituted for the first power system signals with the integrator;
calculating a value of at least one of the second power system signals based a known topology of at least one of the first electric power system equipment or the second electric power system equipment;
sending the second power system signals to the first protection relay as substitute power system signals;
receiving the second power system signals with the first protection relay; and
providing another protection action with the first protection relay using the substitute power system signals.

* * * * *